L. O. Colvin,

Breast Pump.

No. 108,882. Patented Nov. 1, 1870.

Witnesses:
Fred. Haynes
R. F. Rabeau

Inventor:
L. O. Colvin

United States Patent Office.

LEIGHTON O. COLVIN, OF NEWARK, NEW JERSEY.

Letters Patent No. 108,882, dated November 1, 1870.

IMPROVEMENT IN BREAST-PUMPS.

The Schedule referred to in these Letters Patent and making part of the same.

*To all whom it may concern:*

Be it known that I, LEIGHTON O. COLVIN, of Newark, in the county of Essex and State of New Jersey, have invented certain new and useful Improvements in Breast-Pumps, of which the following is a full, clear, and exact description, reference being had to the accompanying drawing forming part of this specification, and in which—

Figure 1:
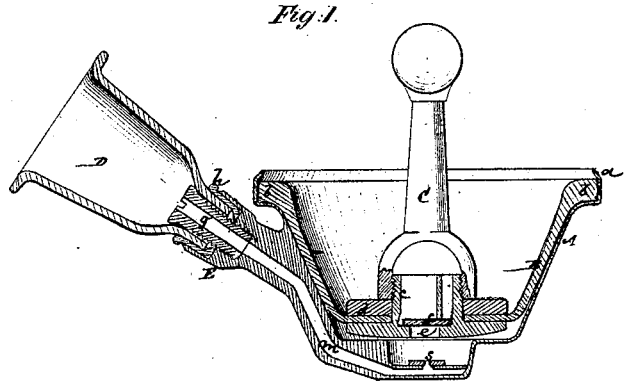
Figure 2:
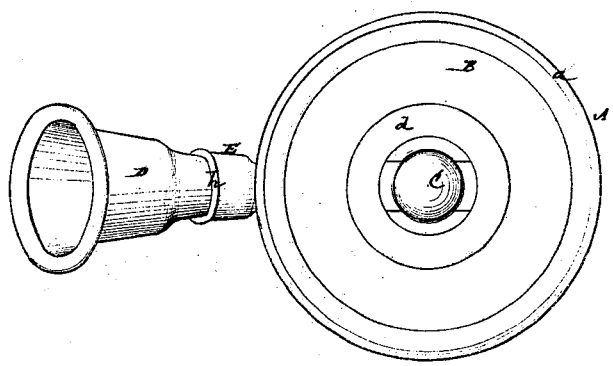

Figure 1 represents a sectional elevation of a breast-pump constructed in accordance with my invention; and Figure 2, a plan of the same.

Similar letters of reference indicate corresponding parts.

This invention, like that patented to me on the 17th of February, 1863, uses a cup, which may be bell-shaped or of flaring form, and contains within it a flexible lining, made to form a close joint with the cup near its outer edge, but free or loose below, for operation of it as a piston, by a handle or lever, and the cup having the nipple arranged to occupy a lateral position relatively to it.

Here, however, the analogy with the pump previously patented to me, as just referred to, ceases, and the construction and action of the present pump is essentially different, the latter comprising a spun-hollow construction of the rim of the cup for retention within it, without a binding or securing-wire, of the flexible and elastic lining at its outer and thickened edge, with facility for its indiscriminate insertion within the cup, and said lining being made capable of operation by its handle or lever in any or various directions, either lateral or rocking, by reason of the delivery-valve, which opens upward or outward, being arranged within or connected with said lever. This valve, in the operation of the pump, is always covered with milk, which insures its perfect action, the milk rising within the operating lining of the cup.

The nipple, which may be made of glass, is attached by an interior hollow-screw, and exterior soft or elastic-packing, to or within a suction branch, which forms a secure and advantageous mode of attachment, with every facility for its detachment to facilitate the fitting on of a different-shaped nipple, or otherwise.

Said suction-branch, although occupying a lateral position, is made to communicate with the cup at its bottom through a contracted aperture at the end of the passage.

By this construction and arrangement the operating lining is prevented from closing the suction-passage and the cup is kept charged with milk, the small aperture at the end of the passage operating as a valve to retain the milk till suction is established, which is kept up by the milk, instead of air as the intervening medium. No milk receptacle other than the cup is required for this pump.

In further explanation of these several features, A, in the accompaning drawing, represents the cup, which is made of metal, with its rim $a$ spun into a hollow or grooved form, to allow of the flexible and elastic diaphragm or lining B, which may be of rubber, being sprung at its thickened edge $b$ into the rim, which thus serves to retain it without the aid of wire binding, and regardless of any particular line of entry, with freedom for its adjustment in a circular direction within the cup.

C is the operating lever, which is attached by a screw-socket and plates $c$ and $d$ to the bottom of the diaphragm B, and has a passage within or through it to the interior of the diaphragm, and, by an aperture, $e$, with the cup on the exterior of said diaphragm, under control of a delivery-valve, $f$, opening upward, and arranged in the lower end of the lever or socket and plate portion of the diaphragm connected therewith.

The milk being discharged through said valve into the interior of the cup or its lining, will always cover the valve, and thus secure at all times the perfect operation of the valve, while the connection of the latter with the lever or diaphragm, as described, allows of the pump being operated either by a lateral or rocking motion of the lever, regardless of direction.

D is the nipple, which may be made of glass, and which is secured in a firm and readily-detachable manner, free from liability to breakage, within a socketed branch, E, by means of an interior hollow screw $g$ and interior soft or elastic packing $h$.

This branch, although arranged to have a lateral position, preferably in an oblique direction relatively to the cup, has its connection made with the bottom of the cup, by means of a passage, $m$, which is in communication with a free space below the diaphragm by a contracted aperture, $s$.

Such connection of the nipple passage with the bottom of the cup prevents the closing of said passage by the diaphragm, and keeps the pump charged with milk, the contracted aperture $s$ operating as a valve to retain the milk till suction is established, which is kept up, to the exclusion of air, by play of the milk within the pump.

What is here claimed, and desired to be secured by Letters Patent, is—

1. The cup A, having its edge spun to form a hollow rim or border, $a$, in combination with the elastic diaphragm or lining B, sprung at its thickened edge $b$ within said rim, substantially as specified.

2. The arrangement of the valve $f$, in combination with the lever C and diaphragm B, for operation by and with the lever, under cover of the milk, essentially as herein set forth.

3. The combination with the nipple D of the hollow screw $g$, the soft packing $h$, and the socketed branch E, essentially as shown and described.

L. O. COLVIN.

Witnesses:
FRED. HAYNES,
R. E. RABEAU.